United States Patent
Scheidig et al.

(10) Patent No.: US 6,603,565 B1
(45) Date of Patent: Aug. 5, 2003

(54) PRINTER AND METHOD FOR CONTROL THEREOF

(75) Inventors: Karola Scheidig, Neufinsing (DE); Volker Warbus, Oberhaching (DE); Heinrich Lay, Töging (DE)

(73) Assignee: Océ Printing Systems GmbH, Poing (DE)

( * ) Notice: Subject to any disclaimer, the term of this patent is extended or adjusted under 35 U.S.C. 154(b) by 0 days.

(21) Appl. No.: 09/403,829

(22) PCT Filed: Apr. 9, 1998

(86) PCT No.: PCT/DE98/01038
§ 371 (c)(1),
(2), (4) Date: Apr. 3, 2000

(87) PCT Pub. No.: WO98/49615
PCT Pub. Date: Nov. 5, 1998

(30) Foreign Application Priority Data

Apr. 30, 1997 (DE) .......................................... 197 18 417

(51) Int. Cl.⁷ ............................................. G06F 15/00
(52) U.S. Cl. .................... 358/1.13; 358/1.15; 358/1.16; 358/1.17
(58) Field of Search ........................... 358/1.2, 1.4, 1.5, 358/1.12, 1.13, 1.14, 1.15, 1.16, 1.17, 442, 468

(56) References Cited

U.S. PATENT DOCUMENTS

| | | | |
|---|---|---|---|
| 5,222,200 A | 6/1993 | Callister et al. ............ | 358/1.13 |
| 5,339,240 A | * 8/1994 | Beaverson .................. | 715/540 |

FOREIGN PATENT DOCUMENTS

| | | |
|---|---|---|
| DE | 41 26 465 C1 | 8/1991 |
| JP | 8-202512 | 8/1996 |
| WO | PCT/DE95/00635 | 5/1995 |
| WO | PCT/US95/09065 | 6/1995 |
| WO | PCT/NL95/00407 | 11/1995 |

* cited by examiner

Primary Examiner—Mark Wallerson
(74) Attorney, Agent, or Firm—Schiff Hardin & Waite

(57) ABSTRACT

A method for controlling a printer includes the steps of generating a plurality of set up data sets such as a first set up data set corresponding to a first printer language and a second set up data set corresponding to a second printer language. Each set up data set comprises language independent control data and language-dependent control data. The method further includes the step of loading the language-independent data and the language-dependent data of the first set up data set corresponding to the first printer language into the main memory of an electronic printer controller. During ongoing printer operation, the method further includes the step of monitoring the print data stream being communicated to the electronic printer controller and determining when a change in printer language from the first printer language to a second printer language occurs in the data stream. The method further includes the step of loading the language-dependent control data of the second set up data set that corresponds to the second printer language into the main memory of the electronic printer controller. A printer with a printer controller with a main memory for receiving set up data sets from the main memory of a control panel is also provided. The printer includes a data bus connecting the printer controller to the control panel, a detector for monitoring the print data stream and determining when the language changes. The detector being in communication with the control panel and sending a signal to the control panel when the printer language changes thereby enabling the control panel to send an appropriate set up data set to the main memory of the printer controller.

11 Claims, 5 Drawing Sheets

PRINTER AND METHOD FOR CONTROL THEREOF

FIELD OF THE INVENTION

The present invention is directed toward printers and methods for controlling printers. More specifically, the present invention is directed toward electronic printers capable of operating using a plurality of printer languages and methods of controlling electronic printers capable of operating using a plurality of printer languages.

The electronic printers are controlled by a plurality of parameters. The various components or, respectively, units of the printer are thereby placed into different conditions dependent on the desired information output.

BACKGROUND OF THE INVENTION

WO-96/02872 A, for example, discloses an electrophotographic high performance printing system having a plurality of units. DE-41 264 65 C1 discloses a control means that connect a EDP system to such an electrophotographic high-performance printer.

The parameters for driving the printer units can vary dependent on the desired print images. For example, horizontal shifts of the print image, various toner types according to color or recording density, etc., can be set, or the printing width can be adapted to a predetermined or, respectively, pre-printed form that is to be printed with individual data of the EDP data source by the printer.

For initializing a printer or when changing the printer from one job of a first type to another job of a second type, it is necessary to read certain setting parameters into a volatile main memory of the printer device controller, for example the length and the width of the paper introduced into the printer; and information as to whether the paper is to be printed single-sided or double-sided; information for saving the contrast for example by selecting specific fixing parameters such as fixing temperature or wrap angle when fixing an electrophotographically produced image on the paper. Added thereto is that the print data that are conducted from an EDP system to a printer can be encoded in a number of possible printer languages or, respectively, emulation modes. Examples of such printer languages or, respectively, emulation modes are ASCII, I-Mode, C-Mode, T-Mode, E-Mode, L-Mode, PCL4-Mode or PCTL5-Mode. Such printer languages and measures for recognizing these printer languages are disclosed, for example, by U.S. Pat. No. 5,222,200 A.

In some electrophotographic high-performance printers, setup data sets are therefore written into the main memory of the printer controller, these corresponding to the desired printer settings and a respective, specific printer language to be processed. Such a printer is disclosed by JP 08-2025152 A. In such printers, it is necessary to load a new setup data set into the main memory when a different setting is desired or when the printer language to be processed changes.

Given high-performance printers that are to be operated in a network, whereby, thus, print requests from the greatest variety of data sources are distributed to a plurality of printers working in parallel in the same data network, it is extremely complicated to place them into a respectively required setting because a great number of parameters are to be set given high-performance printers.

WO 96/01456 A1 discloses a printing system having a host computer and at least one physical printer. Print data are thereby sent from the host computer to a virtual printer type and are printed out by the physical printer that supports this virtual printer type. To that end, various system settings are provided in the physical printer, these being respectively allocated to different virtual printer types. What is thereby disadvantageous is that each standard printer setting appears to be a separate printer for the user.

WO 96/18142 A discloses a printer device and a printing method wherein various printer languages are recognized, whereby a rastering process of the print data is controlled dependent on the recognized printer language. What is disadvantageous given this method is that, after recognizing a printer language, the printer device switches into a standby condition and waits for further inputs of the user before a printout can ensue.

SUMMARY OF THE INVENTION

An object of the invention to specify a printer and a method for controlling a high-performance printer wherein the printer can be adapted relatively simply to the greatest variety of print demands and whereby optimally few adaptations need be undertaken during printing operations.

This object is achieved by the invention comprising features of patent.

Inventively, a setup data set that contains both language-independent control data as well as control data for a plurality of different printer languages is loaded into a main memory of an electronic printer controller.

Compared to the solutions of the prior art, the invention achieves the advantage that the printer controller can have the stored data available to it very quickly from its non-volatile main memory, which has short access times. In a printer system wherein data of different printer languages must often be processed during permanent operation, the printer then very quickly automatically adjusts to modify the languages. On the other hand, the loading of a specific setup data set with language-independent control data such as paper width, type of printing, single-sided or two-sided, fixing device parameters, etc., allows these data to be preserved when the printer language of the incoming data changes. The coupling of these two data types (language-independent and language-dependent) in one and the same setup data set also allows an untrained user to switch relatively simply between setup settings of various types and to thereby retain the compatibility with various printer languages.

Preferably, the setup data set to be loaded is selected from a plurality of different setup data sets that respectively contain different language-dependent control data and/or different language-independent control data.

A high-performance printer is preferably modularly constructed, whereby a device controller is provided for controlling the various unit controls and a control panel unit is provided that is connected to the device controller for exchanging data. Given this embodiment, various setup data sets are stored in the control panel unit, a desired setup data set being loaded therefrom into a main memory of the device controller. Upon reception of print data in a specific print language, the control data corresponding to the print language of the setup data set loaded in the main memory are inventively employed for controlling the printer.

Preferably, a detector means automatically determines the printer language in which the print data are present. Since it can also occur that no setup data set is selected by the user during the course of a printer initialization, it is provided in a further, preferred exemplary embodiment to connect the device controller to a non-volatile memory from which a default setup data set can be loaded. When the detector means for the printer language determines that the user has not selected any setup data set, then the device controller automatically uses the data of the default setup data set.

In an embodiment, the present invention provides a method for controlling a printer comprising the following steps: (a) generating a plurality of setup data sets including a first setup data set corresponding to a first printer language and a second setup data set corresponding to a second printer language, each setup data set comprising language-independent control data and language-dependent control data, (b) loading the language-independent data and the language-dependent data of the first setup data set corresponding to the first printer language into a main memory of an electronic printer controller, (c) during ongoing printer operation, monitoring a print data stream and detecting a change in printer language from a first printer language to a second printer language, (d) loading the language-dependent control data of the second setup data set into the main memory of the electronic printer controller.

In an embodiment, step (a) further comprises storing a third setup data set comprising voice-dependent data of a plurality of printer languages into a main memory of a control panel unit, and step (d) further comprises loading the language-dependent control data of the second setup data set from the main memory of the control panel unit to the main memory of the electronic printer controller.

In an embodiment, step (a) further comprises storing the plurality of setup data sets into a main memory of a control panel unit and step (d) further comprises transferring the language-dependent control data of the second setup data set from the main memory of the control panel unit to the main memory of the electronic printer controller.

In an embodiment, step (a) further comprises storing the plurality of setup data sets into a hard drive of a control panel computer and step (d) further comprises transferring the language-dependent control data of the second setup data set from the hard drive of the control panel computer to the main memory of the electronic printer controller.

In an embodiment, step (b) further comprises transferring the language-independent data of the first setup data set from a main memory of a control panel unit into the main memory of the electronic printer controller.

In an embodiment, step (d) further comprises loading the language-independent control data of the second setup data set into the main memory of the electronic printer controller.

In an embodiment, step (c) further comprises detecting the printer language of the print data with a detector means.

In an embodiment, the present invention provides a printer for printing out data streams of various print languages, the printer comprising: a printer controller comprising a main memory in which control data can be stored, the printer controller receiving a print data stream, a control panel comprising a main memory with a plurality of setup data sets stored therein, each setup data set corresponding to a different printer language, each setup data set comprising language-independent control data and language-dependent control data, a data bus connecting the printer controller to the control panel, setup data sets being transferred from the main memory of the control panel to the data bus to the main memory of the printer controller, a detector for monitoring the print data stream and determining the printer language, the detector being connected to the control panel and sending a signal to the control panel when the printer language in the print data stream changes, the control panel transferring a new setup data set to the printer controller upon receipt of one of said signals from the detector.

In an embodiment, the main memory of the printer controller further comprises a predetermined default setup data set transferred from a non-volatile memory of the printer controller.

In an embodiment, the main memory of the control panel further comprises a user-defined setup data set.

In an embodiment, the printer controller is connected to a plurality of unit controls of the printer.

Other objects and advantages of the present invention will become apparent from reading the following detailed description and appended claims, and upon reference to the accompanying drawings.

BRIEF DESCRIPTION OF THE DRAWINGS

Further exemplary embodiments of the invention are explained in greater detail below with reference to the drawings wherein.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 5:
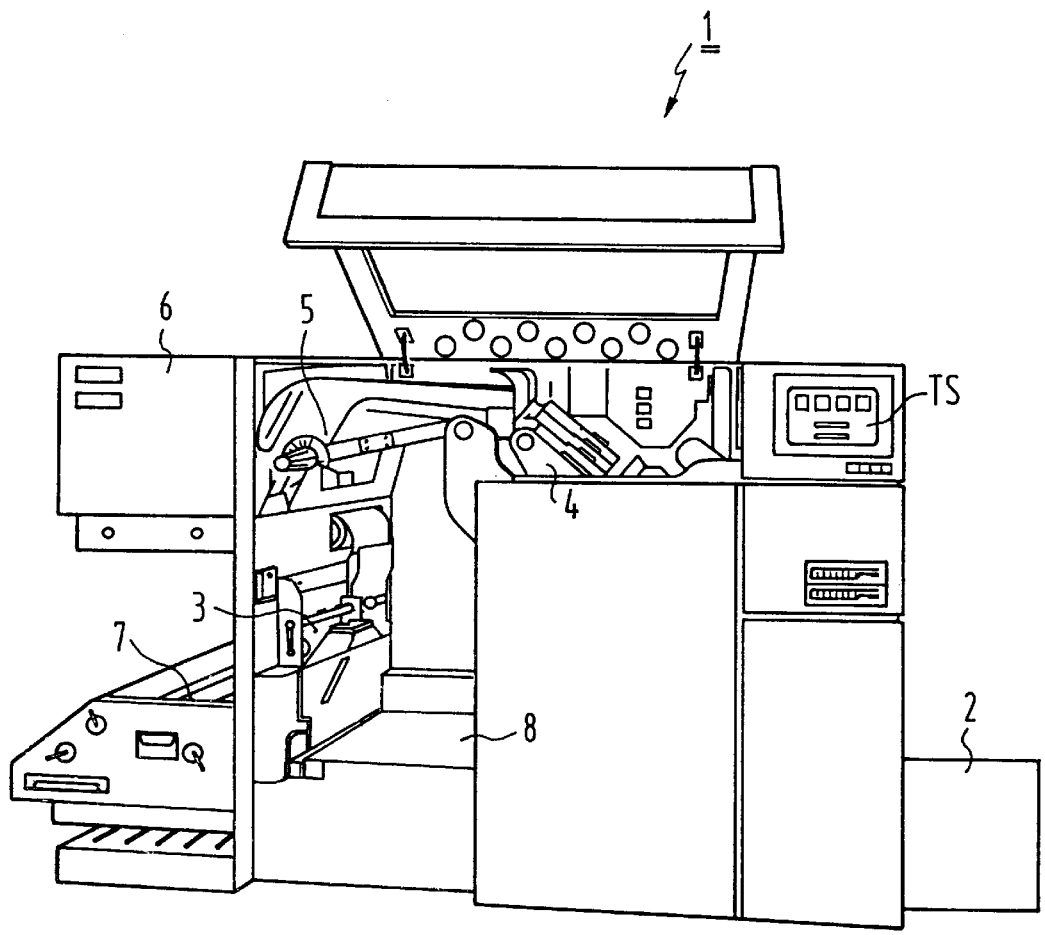
FIG. 5 is a schematic illustration of a prior art printer.

An electrophotographic high-performance printer 1, as shown in FIG. 5, comprises a paper supply 2 from which paper 8 is taken and transported to a printing unit 4 via a paper delivery 3. The information to be printed is transferred therein onto the paper via an electrophotographic process, in that toner is applied onto the paper. Subsequently, the paper 8 is forwarded from a transfer station 5 to a fixing station 6 wherein the toner is fixed on the paper 8 with heat. Finally, the printed paper 8 is stacked on a deposit station 7 and can be removed therefrom for further processing. The operation of the printer 1 ensues via a display and input picture screen (touch screen TS), whereby the operator can input information directly at the picture screen by touching the picture screen surface.

Figure 1:
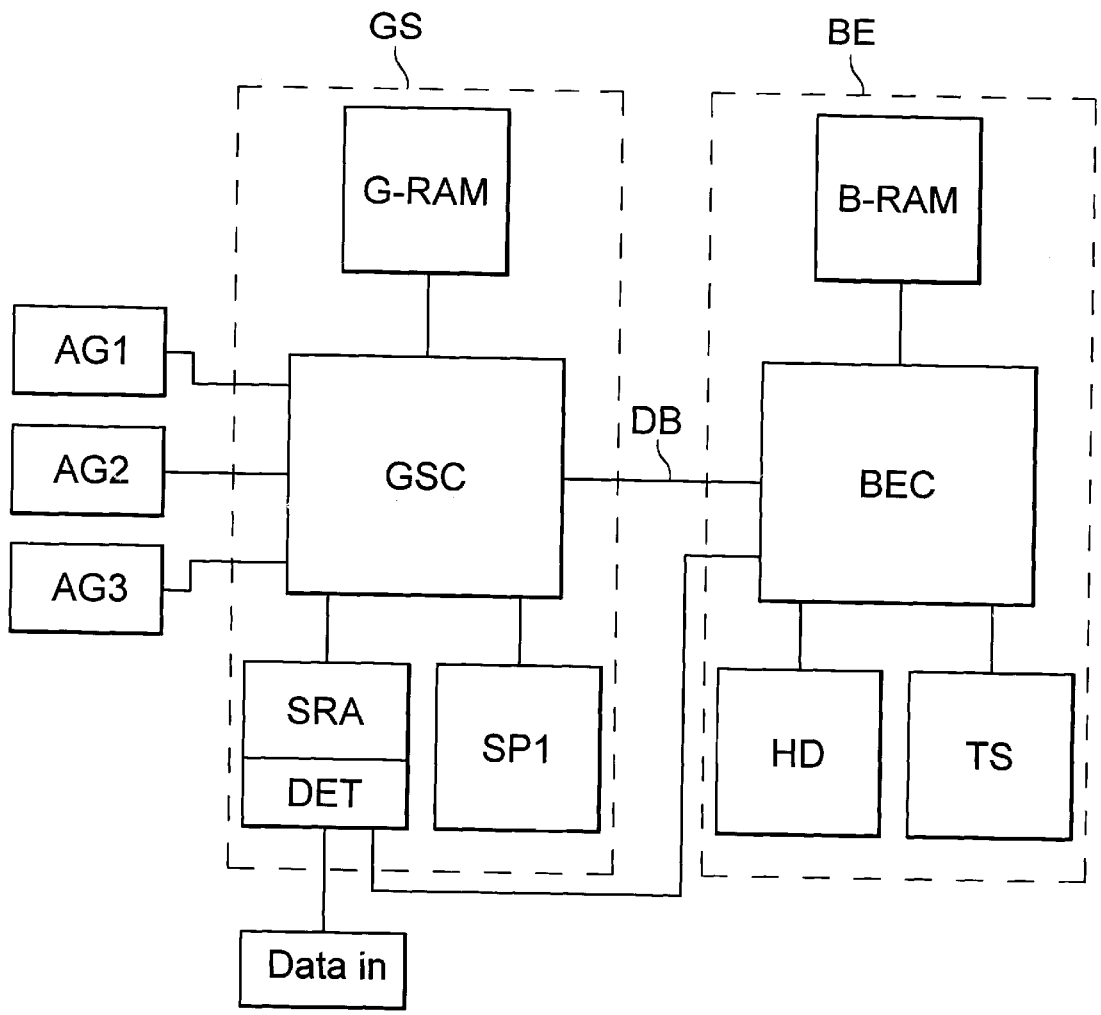
FIG. 1 is a schematic illustration of the electronic component of the printer of the present invention and as used for carrying out the method of the present invention.

FIG. 1 shows electronic components for controlling a printer. A device controller GS is thereby connected via data bus DB to a control panel unit BE. Further, it is connected to various electronic unit controls AG1, AG2 and AG3 that respectively drive various units of the printer. The device control controller GSC is connected via a print language connection unit SRA to the interface "data in" to an EDP printing data source.

After turning on the printer, a software program is loaded into the volatile main memory G-RAM of the device controller GS from a non-volatile memory SP1 such as an NV-RAM, EEPROM or from a hard disk. This program controls the further executions of the device controller GS. During the course of loading the working program into the main memory G-RAM, the controller GSC also activates the control panel unit BE. To that end, a control panel software program is loaded into the main memory B-RAM of the control panel unit BE from a non-volatile memory such as a hard disk HD of the control panel unit BE.

This program in turn activates the touch screen TS. A controller BEC of the control panel unit BE controls the executions within the control panel unit BE. The control panel BE is an independent system within the print controller that, for example, can be based on a conventional PC (personal computer).

The data transmission between device controller GS and control panel unit BE ensues via a data bus DB to which the two controllers GSC and BEC are connected. The data bus DB can be fashioned as serial or parallel interface.

The executive sequence for initializing a printer is then as follows: in a one-time initialization procedure, an operator inputs machine-dependent data such as paper width, paper length, etc. for a specific type of data reproduction (print job) at the control panel unit BE. In addition, he inputs all setting data for different printer languages (emulation modes) suitable for these machine-dependent data. All interrelated, machine-dependent and emulation mode-dependent data of a setup are deposited on the hard disk HD of the control panel unit BE under a specific setup name (for example, Setup 1). Overall, thus, a few tens or even hundreds of parameter sets (setup data sets) can thus be deposited on the hard disk HD of the control panel means BE.

Figure 2:
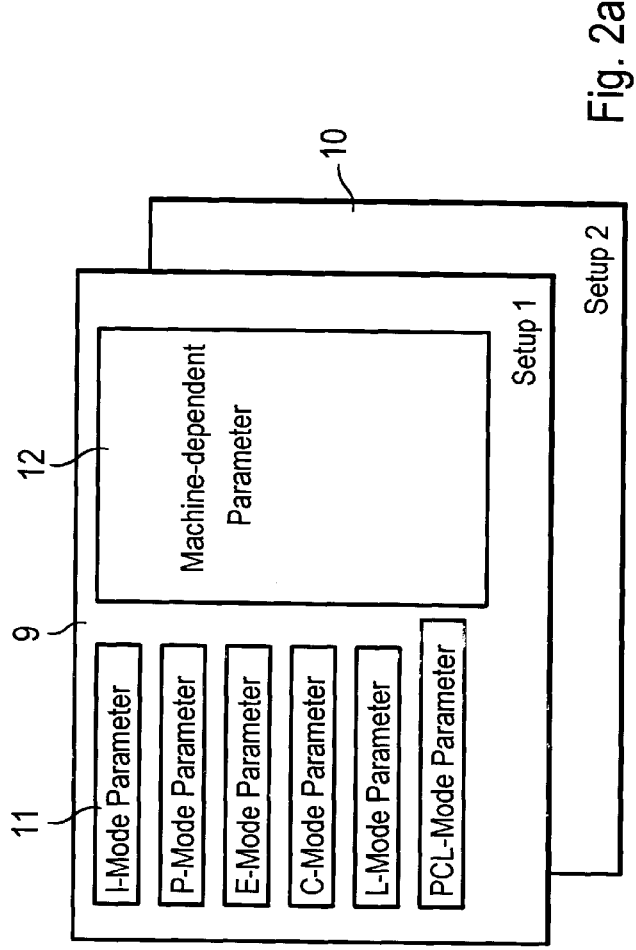
FIG. 2 is a schematic illustration of example set up data sets.

FIG. 2a shows the data structure produced in this way on the basis of an example of two setups 9 and 10. Each setup data set is divided into language-dependent parameters 11 and into machine-dependent parameters 12. The data of various printer languages (emulation modes) as well as machine-dependent parameters matching therewith are respectively stored in a setup data set.

FIG. 2b shows exemplary values of machine-dependent data and emulation mode-dependent data of a setup data set.

Figure 3:
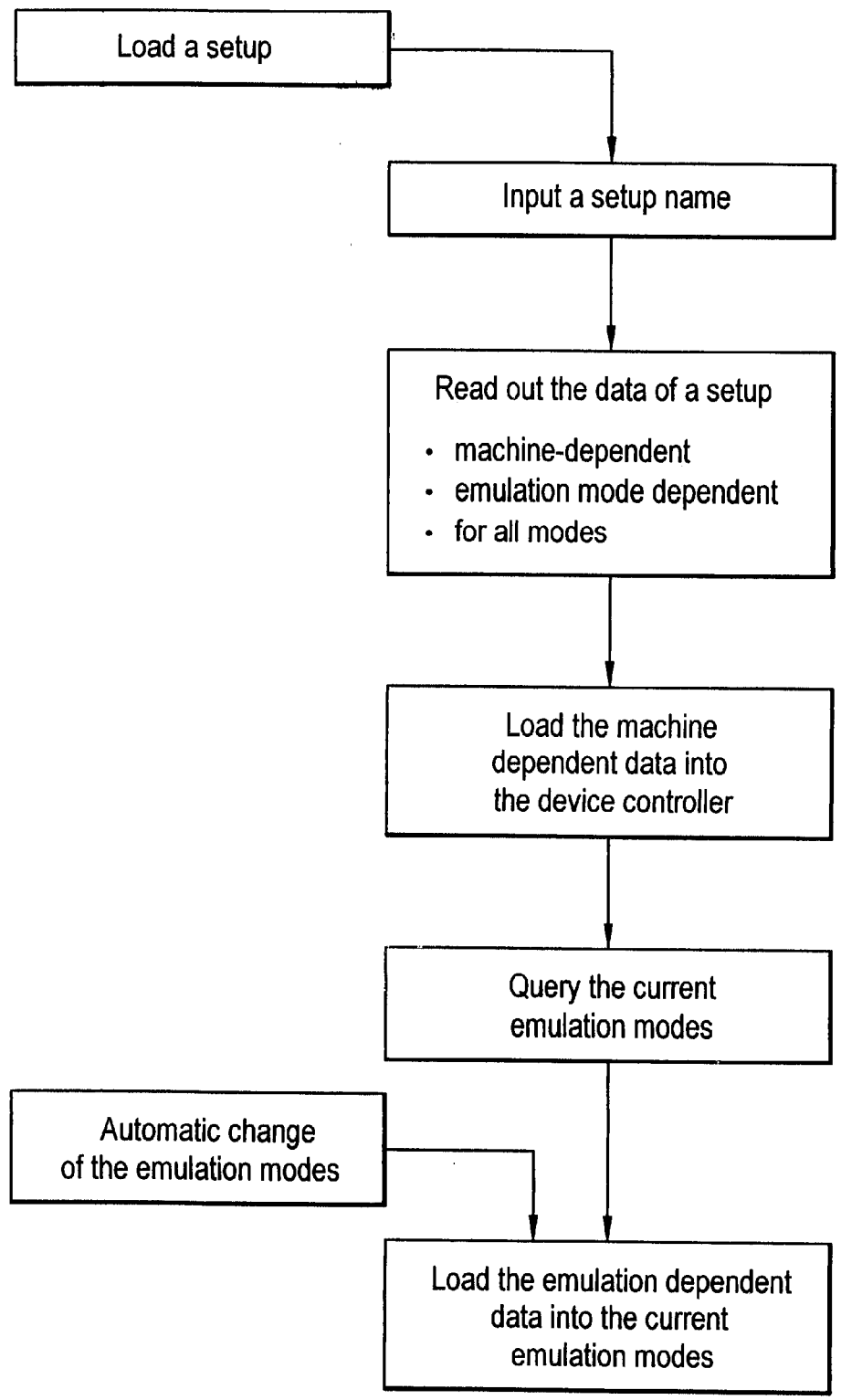
FIG. 3 is a flowchart schematically illustrating the method of the present invention as used for controlling the printer of the present invention.

FIG. 3 shows the executive sequence for loading setup. The names of all stored (deposited) setup data sets are displayed for the operator of the printer in a list. The operator selects a setup data set from this list or, respectively, inputs the name of the setup. The corresponding data of this setup—all machine-dependent data and all emulation-dependent data of all emulation modes—are read out in the control panel and are loaded into the main memory of the control panel unit. Subsequently, the controller BEC of the control panel unit BE checks which print data are currently adjacent at the printer. This occurs via the detector DET of a character generator controller SRA in the device controller GS (see FIG. 1). The control panel unit transfers the emulation mode data matching this emulation mode from the memory B-RAM into the main memory G-RAM of the device controller.

When the print data stream coming from the EDP system during ongoing operations changes to a different emulation mode (i.e., to a different printer language), then the detector DET informs the control panel unit BE of this, the latter then loading the corresponding data matching the new printer language into the main memory G-RAM of the device controller GS.

Figure 4:
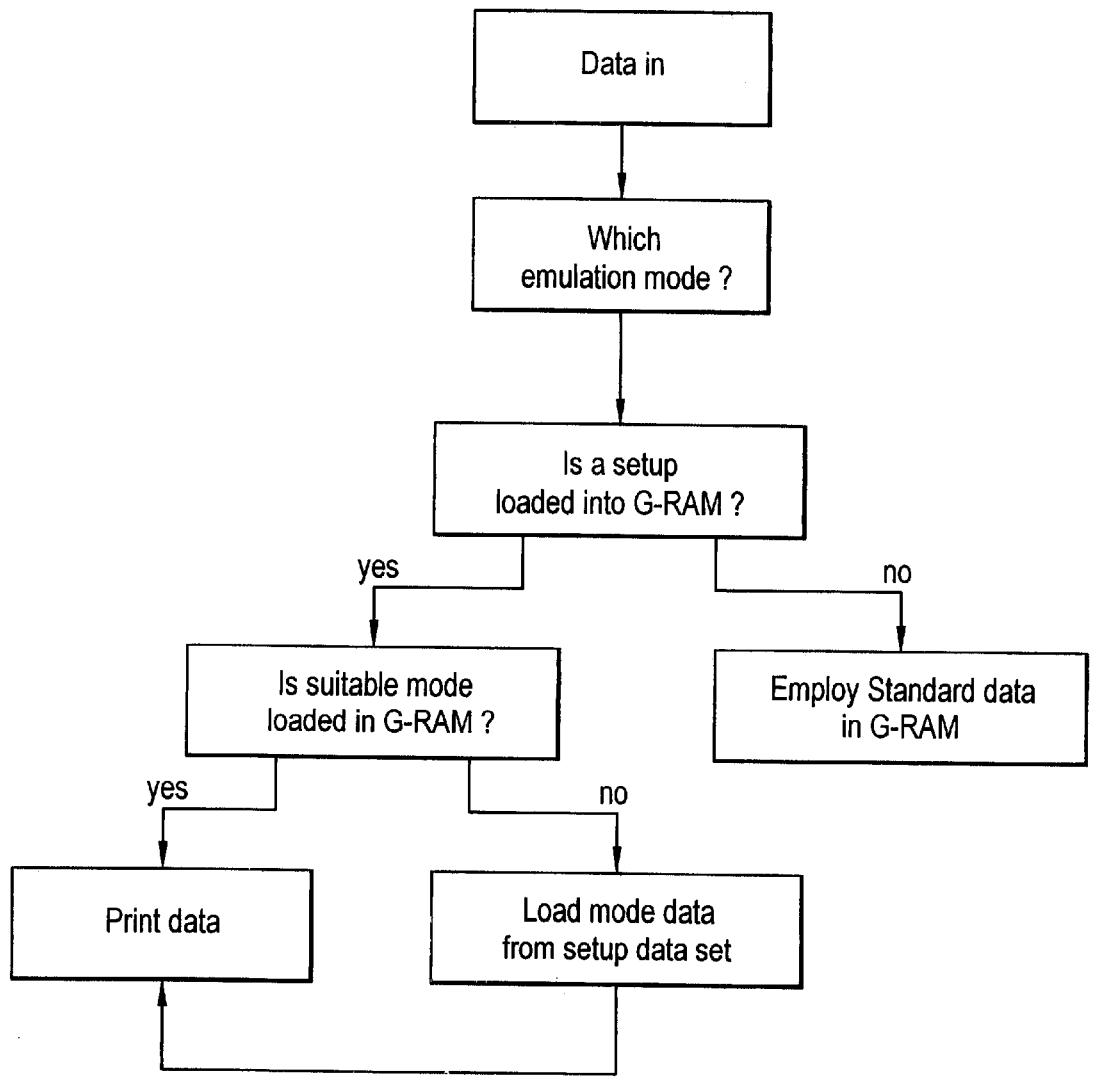
FIG. 4 is a flowchart schematically illustrating the method of the present invention as used for controlling the printer of the present invention when print data are adjacent.

FIG. 4 again shows in detail which checks ensue when a data stream proceeds into the device controller GS. The detector DET checks which emulation mode is present in the data and reports this result to the control panel unit BE. The latter checks whether a setup data set is loaded in the main memory G-RAM. When this is the case, then a check is carried out to see whether the mode-dependent data matching this mode are loaded in the G-RAM. If yes, the data are printed; if no, then the corresponding mode data are loaded from the B-RAM into the G-RAM.

When, by contrast, no setup data set whatsoever is loaded in the memory G-RAM, then standard (default) setup data are loaded from the non-volatile memory SPI of the device controller into the main memory G-RAM.

Exemplary embodiments were described. It is thereby clear that expansions can be recited at any time. For example, it can be provided that only specific data dare be set by a standard operator, and that the input of specific data dare be input or, respectively, modified only by authorized persons who indicate an appropriate password. Further, it is clear that parameters are always present in a highly complex printer system such as electrophotographic high-performance printers that cannot be a constituent part of setup settings. Such data are dependent on setup data sets, deposited in separate memory areas.

It can be provided in a development of the invention, for example, to load all setups data sets from the hard disk of the control panel unit into the main memory of the control panel unit upon initialization of the control panel unit program. As a result thereof, these data sets can be very quickly modified by the operator or, respectively, transferred into the main memory of the device controller. Finally, it could be provided to load all setup data sets into the main memory of the device controller and to respectively activate a desired data set thereat.

From the above description, it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

LIST OF REFERENCE CHARACTERS

AG1 Unit control 1
AG2 Unit control 2
AG3 Unit control 3
BE Control panel
BEC Controller of the control panel unit
B-RAM Main memory of the control panel unit
DB Data bus
DET Detector for emulation mode
G-RAM Main memory of the device controller
GS Device controller
GSC Controller of the device controller
HD Hard disk
SP1 Memory for default values
SRA Controller for character generator
TS Touch screen
1 High-performance printer
2 Paper supply
3 Paper delivery
4 Printing unit
5 Transfer station
6 Fixing station
7 Deposit station 8 Paper
9 Setup 1
10 Setup 2

What is claimed is:

1. A method for controlling a printer comprising the following steps:
    (a) generating a plurality of setup data sets including a first setup data set corresponding to a first printer language and a second setup data set corresponding to a second printer language, each setup data set comprising language-independent control data and language-dependent control data,
    (b) loading the language-independent data and the language-dependent data of the first setup data set corresponding to the first printer language into a main memory of an electronic printer controller,
    (c) during ongoing printer operation, monitoring a print data stream and detecting a change in printer language from a first printer language to a second printer language,
    (d) loading the language-dependent control data of the second setup data set into the main memory of the electronic printer controller.

2. The method of claim 1 further comprising the following step after step (a):
    storing a third setup data set comprising voice-dependent data of a plurality of printer languages into a main memory of a control panel unit, and
    step (d) further comprises loading the language-dependent control data of the second setup data set from the main memory of the control panel unit to the main memory of the electronic printer controller.

3. The method of claim 1 wherein step (a) further comprises storing the plurality of setup data sets into a hard drive of a control panel computer and step (d) further comprises transferring the language-dependent control data of the second setup data set from the main memory of the control panel to the main memory of the electronic printer controller.

4. The method of claim 1 wherein step (a) further comprises storing the plurality of setup data sets into a hard drive of a control panel unit and step (d) further comprises transferring the language-dependent control data of the second setup data set from the hard drive of the control panel computer to the main memory of the electronic printer controller.

5. The method of claim 1 step (b) further comprises transferring the language-independent data of the first setup data set from a main memory of a control panel unit into the main memory of the electronic printer controller.

6. The method of claim 1 wherein step (d) further comprises loading the language-independent control data of the second setup data set into the main memory of the electronic printer controller.

7. The method of claim 1 wherein step (c) further comprises detecting the printer language of the print data with a detector means.

8. A printer for printing out data streams of various print languages, the printer comprising:
    a printer controller comprising a main memory in which control data can be stored, the printer controller receiving a print data stream,
    a control panel comprising a main memory with a plurality of setup data sets stored therein,
    each setup data set corresponding to a different printer language, each setup data set comprising language-independent control data and language-dependent control data,
    a data bus connecting the printer controller to the control panel, setup data sets being transferred from the main memory of the control panel to the data bus to the main memory of the printer controller,
    a detector for monitoring the print data stream and determining the printer language, the detector being connected to the control panel and sending a signal to the control panel when the printer language in the print data stream changes,
    the control panel transferring a new setup data set to the printer controller upon receipt of one of said signals from the detector.

9. The printer of claim 8 wherein the main memory of the printer controller further comprises a predetermined default setup data set transferred from a non-volatile memory of the printer controller.

10. The printer of claim 8 wherein the main memory of the control panel further comprises a user-defined setup data set.

11. The printer of claim 8 wherein the printer controller is connected to a plurality of unit controls of the printer.

* * * * *